United States Patent
Guimet et al.

(10) Patent No.: US 8,840,117 B2
(45) Date of Patent: Sep. 23, 2014

(54) SEALING ELEMENT HAVING AN ELASTIC TAPERED WASHER AND CASING TO EXERT PRESSURE

(75) Inventors: Laurent Guimet, Unieux (FR); Ludovic Morice, Saint Etienne (FR); Michel Lefrancois, Saint Etienne (FR); Jean-François Juliaa, Montelimar (FR)

(73) Assignees: Commissariat a l'Energie Atomique et aux Energies Alternatives, Paris (FR); Technetics Group France SAS, Saint Etienne (FR)

( * ) Notice: Subject to any disclaimer, the term of this patent is extended or adjusted under 35 U.S.C. 154(b) by 0 days.

(21) Appl. No.: 13/634,382

(22) PCT Filed: Apr. 11, 2011

(86) PCT No.: PCT/EP2011/055618
§ 371 (c)(1),
(2), (4) Date: Sep. 12, 2012

(87) PCT Pub. No.: WO2011/128289
PCT Pub. Date: Oct. 20, 2011

(65) Prior Publication Data
US 2013/0026715 A1    Jan. 31, 2013

(30) Foreign Application Priority Data
Apr. 14, 2010 (FR) ..................... 10 52848

(51) Int. Cl.
| F16J 15/02 | (2006.01) |
| F16F 1/18 | (2006.01) |
| F16F 1/34 | (2006.01) |
| F16J 15/34 | (2006.01) |
| F16J 15/36 | (2006.01) |

(52) U.S. Cl.
CPC .............. *F16J 15/3452* (2013.01); *F16J 15/36* (2013.01)
USPC ............................ 277/637; 267/159; 267/161

(58) Field of Classification Search
USPC ......... 277/590, 591, 598, 628, 630, 637, 652, 277/653, 616, 609; 411/526, 903, 162, 164, 411/165
See application file for complete search history.

(56) References Cited

U.S. PATENT DOCUMENTS

| 3,480,285 A | 11/1969 | Anderson |
| 4,379,560 A * | 4/1983 | Bakken .......................... 277/628 |

(Continued)

FOREIGN PATENT DOCUMENTS

| DE | 1074342 B | 1/1960 |
| DE | 19846124 C1 | 3/2000 |

(Continued)

OTHER PUBLICATIONS

International Search Report for PCT/EP2011/055618; Nov. 5, 2011.

*Primary Examiner* — Kristina Fulton
*Assistant Examiner* — L. Susmitha Koneru
(74) *Attorney, Agent, or Firm* — Pearne & Gordon LLP

(57) ABSTRACT

A static sealing element (1) includes an elastic tapered washer (10) the deformation of which enables a force to be transmitted, a casing (18) to establish the seal, and two supporting washers (27 and 28) which transmit the forces originating from the elastic washer (10) to the curved edges (20, 21) of the casing (18) so as to exert on them a pressure which maintains the seal. The casing (18) made thus be manufactured from a ductile material, but one which is less deformable than the customary elastomers.

14 Claims, 3 Drawing Sheets

(56) References Cited

U.S. PATENT DOCUMENTS

Figure 1:
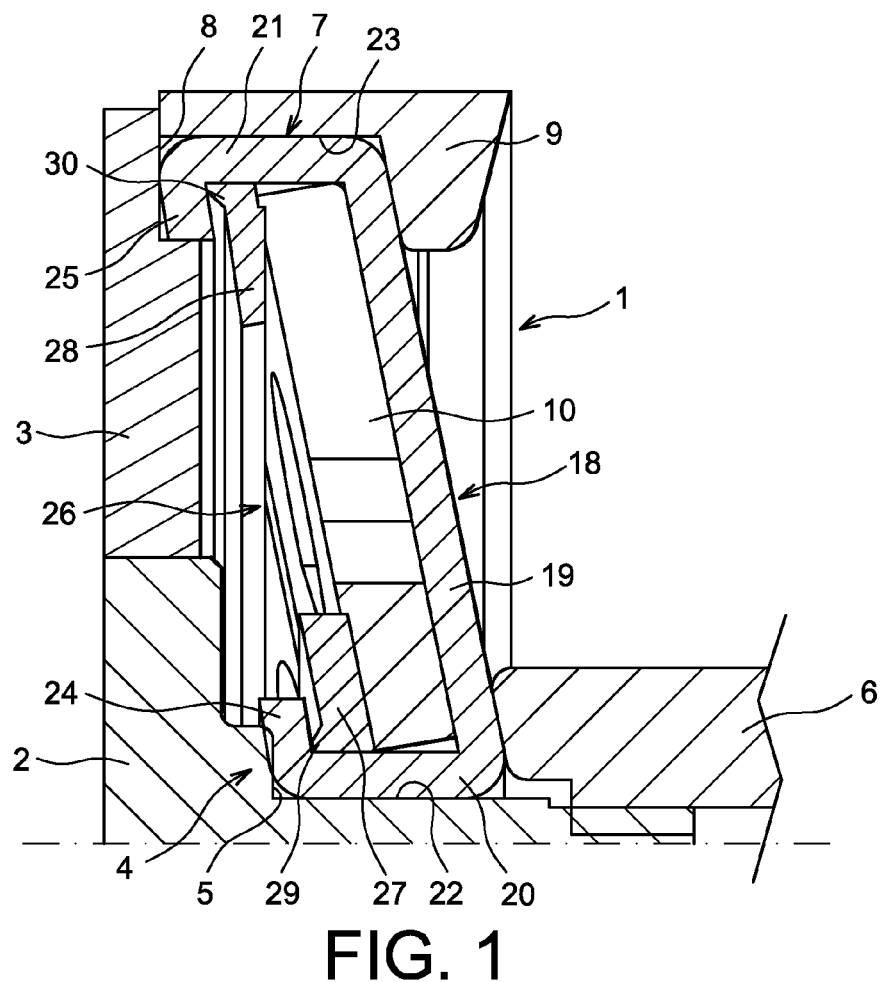

| | | | | |
|---|---|---|---|---|
| 4,629,048 A | * | 12/1986 | Draper et al. | 192/70.27 |
| 4,747,586 A | * | 5/1988 | Reik | 267/161 |
| 4,799,654 A | * | 1/1989 | Eickmann | 267/162 |
| 5,033,426 A | * | 7/1991 | Reichenbach et al. | 123/193.3 |
| 5,400,888 A | * | 3/1995 | Hernandez | 192/89.25 |
| 5,628,389 A | * | 5/1997 | Wittmann et al. | 192/70.252 |
| 5,738,359 A | * | 4/1998 | Gundy | 277/606 |

FOREIGN PATENT DOCUMENTS

| | | |
|---|---|---|
| FR | 2254989 A5 | 7/1975 |
| WO | 8604655 A1 | 8/1986 |

* cited by examiner

SEALING ELEMENT HAVING AN ELASTIC TAPERED WASHER AND CASING TO EXERT PRESSURE

TECHNICAL FIELD

The present invention relates to a sealing element including an elastic tapered washer and a casing to exert pressure.

Certain sealing devices between a rotor and a stator operate by axial contact between two units, one linked to the stator, and the other connected to the rotor. In the contact zone between the units, appropriate sealing elements in axial contact, rigidly linked respectively to the units of the rotor and stator, or merged with them, enable a seal to be obtained between the rotor and stator portions by means of this contact. In order to maintain a seal, notably when the said sealing elements are subject to wear and tear, one of the units, called hereinafter "the moving unit", retains a degree of freedom in the axial direction, and axial contact with the second unit is provided by an elastic element pushing the moving unit. A notion of "pressure rating of the sealing device" thus appears. Furthermore, secondary sealing elements are positioned between the stator unit and the stator, and also between the rotor unit and the rotor. In certain designs, mechanical elements enable the secondary sealing and pressurisation functions of the moving unit to be contained in a single part. A common construction consists in giving them an elastic tapered washer core, the deformation of which determines this force. The seal of these secondary elements positioned between two parts which are not in relative rotation, and which therefore exert a static seal, is provided by a casing, generally made of an elastomer, completely surrounding the elastic washer. Such a design is disclosed, among others, by document WO-A-86/004655.

An advantage of such devices is that the secondary sealing elements are of simple design. Another is that, by means of appropriate construction of the devices, the impurities of the confined medium, which can include abrasive particles, are repelled by the centrifugal forces towards the secondary sealing elements, rather than towards the main seal, where they might cause damage between the rotating portions. A disadvantage derives, however, from the use of a casing made of elastomer, which is able to resist only low temperatures. Other static secondary sealing elements, such as metal bellows, are therefore used for higher temperatures; where these bellows are generally connected to parts between which they are extended by welds; their sealing is excellent, but solid impurities discharged towards them tend to accumulate between their bellows elements, and ultimately modify the value of the pressure which they transmit, which can make the device unusable.

The object of the invention was to propose a secondary sealing element including a tapered washer, transmitting the pressure to another portion of the device, and a casing of the washer, providing the seal and manufactured from a material which is resistant at a high temperature. More specifically, an improved design of the secondary and static sealing element has been proposed, by safeguarding the sealing capacity of the casing despite the need to use materials which are much more deformable than elastomers in order to manufacture it, and therefore less able to take on closely the shape of the surfaces of the opposing pieces, and to compensate for the deformation variations to which the elastic washer is subject after the pressure required. The invention also enables compensation to be made for the manufacturing difficulties inherent to the use of a sealing material which is less deformable than an elastomer.

A definition of the element is therefore a sealing element, including an elastic tapered element and a casing surrounding the washer, and having seal support portions on an outer circumference and an inner circumference, characterised in that the casing includes a continuous strip in front of one face of the washer, and curved edges at the support portions, where the curved edges include ends extending in front of a portion of a face opposite the washer, and in that it includes two supporting washers housed respectively between the elastic washer and the ends of the curved edges.

The main function of the supporting washers is to apply the curved edges of the casing against the surrounding support faces aligned in an axial or radial direction, and therefore to provide the seal.

The elastic washer can advantageously be a crenellated washer, monobloc, or consisting of adjacent but separate sectors on at least one periphery; and can notably be made of a pattern repeated multiple times, and thus consisting of radial segments alternating with outer circumference and inner circumference segments. Such a washer provides greater manufacturing freedom to give it a stiffness and a possible deformation course, i.e. in order to determine the pressure as desired. The pressure exerted on the casing by such a crenellated washer would be irregular, and less strong between the sectors, which could impair the seal. This is, however, prevented due to the supporting washers, which are continuous over their entire circumference, and which therefore re-establish the pressure uniformity on the casing.

The latter may be manufactured from PTFE, and notably "restructured" PTFE, which has the feature that it is subject to less creep than ordinary PTFE, and that it therefore retains its seal better over time.

At least one of the supporting washers (and preferably both) advantageously have a bead pointing towards the curved edge of the casing, and which concentrates the pressure responsible for the seal in a determined line, providing an improved guarantee of its quality. The bead may be pointing away from the elastic washer in order to establish a pressure in the axial direction of the element against the end of the curved edge, or it may be pointing radially beyond the elastic washer, so as to exert a radial pressure; it may also include both these characteristics at once. The radial bead also enables the position of the supporting washers to be made invariable with regard to the casing, whatever the deformations of the elastic washer.

The correctly centred position of the supporting washers can be maintained if the elastic washer has at least one circular stop notch to stop these washers. According to another improvement, a metal washer can be added on an inner face or on the face opposite the casing's main strip, in order to protect it from any corrosive fluids which may be on this side. This metal washer, which is more similar to a coating, is in any event finer than the elastic washer and the supporting washers, and must not contribute to the stiffness of the element.

Finally, the supporting washers can be separate, or on the contrary connected to one another by a finer strut.

The invention will now be described in relation to the figures, which represent one embodiment of it.

Figure 2:
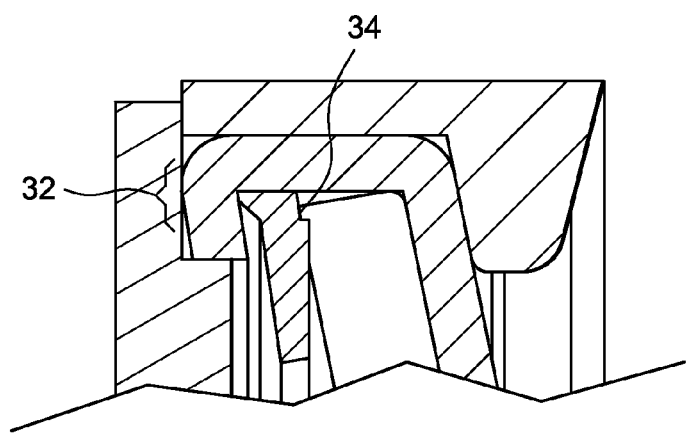
Figure 3:
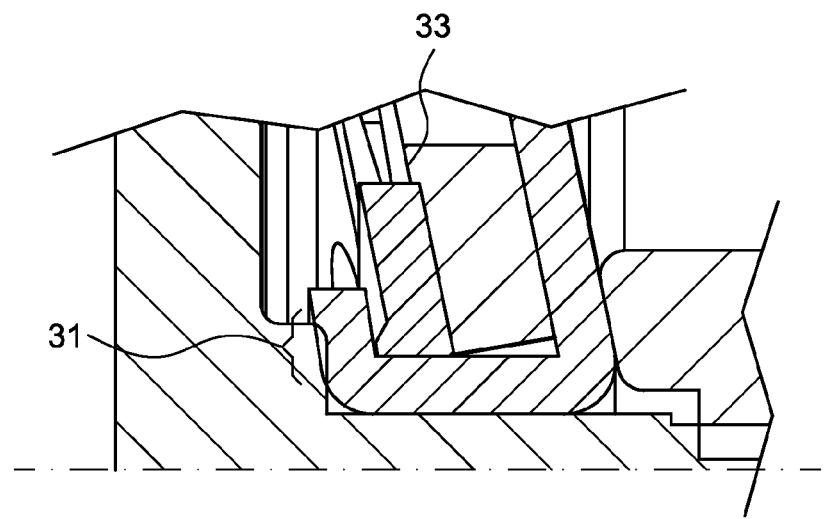
Figure 5:
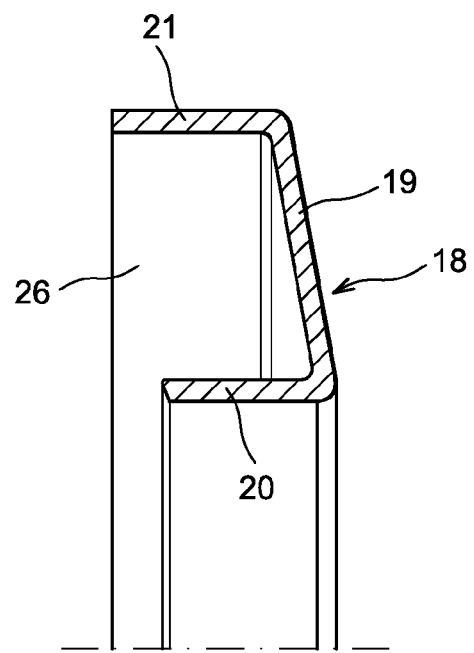
Figure 4:
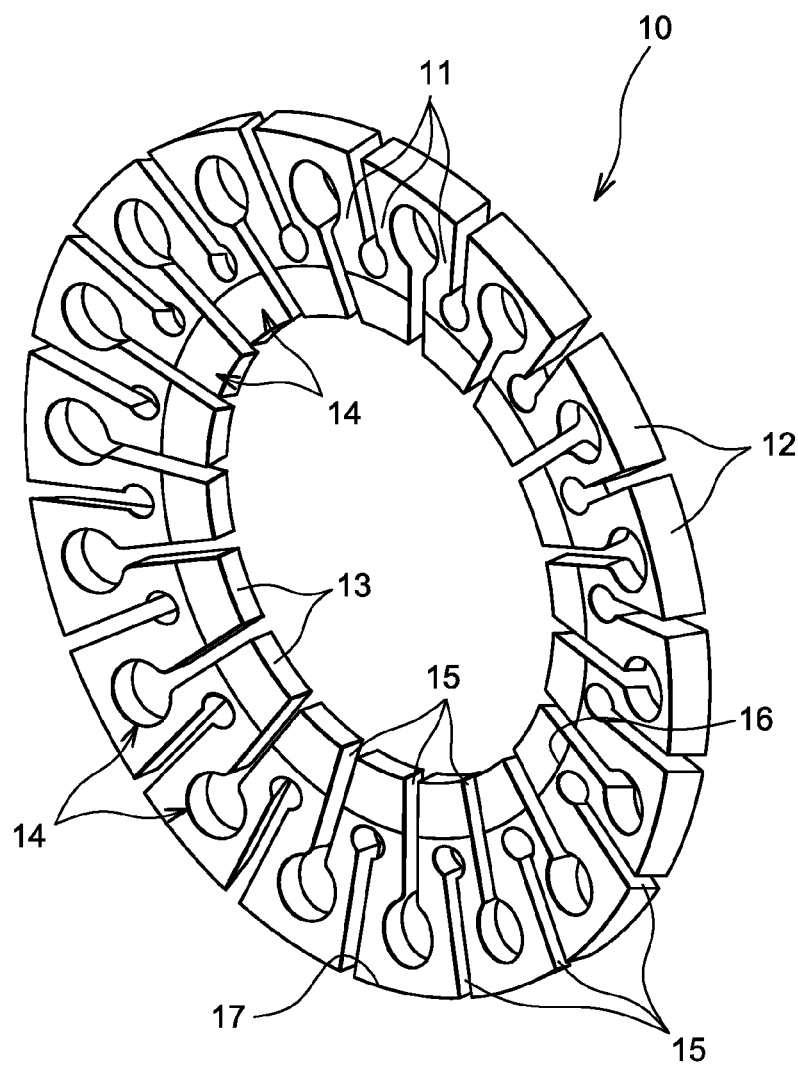

FIG. 1 represents an element in accordance with the invention as a transverse section, FIGS. 2 and 3 the details of both ends of this section, FIG. 4 the elastic washer and FIG. 5 the washer before manufacture.

Reference is firstly made to FIG. 1. In this case, sealing element (1) in accordance with the invention is positioned between a main rotating shaft (2) of a rotor, and a sealing unit (3) surrounding the shaft (2), rotating with it but without being attached to it. The sealing element (1) is of a general circular and truncated shape, concentric to the rotor's rotational axis (X). Its other sections are approximately similar to the latter. Unit (3) typically forms part of a sealing device also including a main gasket seal on a side opposite the sealing element (1), followed by a fixed sealing unit as an extension of the unit (3), and another secondary sealing element, which may be similar to sealing element (1), connecting the second unit to a stator. This device outside the invention has not been represented, but reference can be made to the patent indicated above for a more complete description. Unit (3) slides around shaft (2) so as to exert a configurable force on the main gasket seal. Sealing element (1) assists in transmitting this force. Its inner end (4) is compressed between a flat span (5), aligned axially, of shaft (2) and a span of the same type belonging to a locking ring (6) screwed on to shaft (2). The outer end (7) of sealing element (1) is similarly compressed between a flat span (8), aligned axially, of unit (3) and a span of the same type of a locking ring (9) screwed on to unit (3).

Sealing element (1) includes a tapered elastic washer (10) which constitutes its core, represented completely in FIG. 4. It consists of a pattern repeated multiple times to give alternatively segments (11) aligned radially and segments of outer (12) or inner (13) circumference. When either of the circumferences is considered, the assembly forms sectors (14) alternating with notches (15). One face of the elastic washer (10) also has an inner notch (16) and an outer notch (17), both of them circular, which will be described below.

Sealing element (1) also includes an outer casing (18) consisting of a continuous strip (19) in front of the elastic washer (10), which rests on it, and inner curved edge (20) and an outer curved edge (21) attached to the strip (19) and which rest on circular spans (22 and 23) of shaft (2) and of the locking ring (9). Curved edges (20 and 21) include ends (24 and 25) at right angles, supported on flat spans (5 and 8). The material of the casing is ductile, for example metal, in order that it may adjust correctly to the surfaces on which it rests. The casing (18) therefore surrounds a housing (26) which is partially closed by the ends (24 and 25) and which contains, in addition to the elastic washer (10), an inner supporting washer (27) and an outer supporting washer (28), the former being held against the inner curved edge (20), and the latter being held against the outer curved edge (21). All the washers (10, 27, 28) are held in place by the ends of the curved edges (20 and 21).

The supporting washers (27 and 28) are essentially tapered, with a taper angle close to that of the elastic washer (10), and have a bead, respectively (29 and 30), which is prominent both in the axial and radial directions, in contact with the curved edge (20 or 21) of the casing (18). Each of these beads (29 and 30) allows the compression force produced by the locking ring (6 or 9) to be transmitted through the sealing element (1), by pressing against the curved end (24 or 25), and thus provides the pressured contact of the curved end (24 or 25) on the axle span (5 or 8), in regions (31 or 32) represented in FIGS. 2 and 3. The compression established in this location thus provides a seal. The radial prominences of the beads (29 and 30) similarly maintain the curved ends (20 and 21) against the circular spans (22 and 23) and also strengthen the seal. The pressure irregularities due to the alternation of the sectors (14) and of the notches (15) are eliminated by the supporting washers (27 and 28). The supporting washers (27 and 28) rest on the elastic washer (10), forming inside recesses (33 and 34) at the limits of the notches (16 and 17). Their centring is thus maintained, and with it the cohesion of the seal of the sealing element (1): the positions of the sealing regions (31 and 32) are not modified despite the deformations of the elastic washer (10).

The supporting washers (27 and 28) can be separated or united by a finer, deformable strut (not shown), which holds them lightly without modifying their positions, which are defined by the other constituents of the sealing element (1). The casing (18) and in particular the strip (19) can support a fine washer (not shown) on one of its faces, against the elastic washer (10) on the locking rings (6 and 9), in order to protect it.

The casing (18) can be manufactured by plastic deformation of the circular strip, which is initially flat, of the desired material. This may be PTFE and notably restructured PTFE such as that sold by the company Garlock under the name Gylon. Other materials can be suitable, provided they have sufficient ductility to be adjusted to the neighbouring portions, and provide a seal with them under the effect of the pressure of the washers. The latter are generally metal. The recess (26) is formed, as is shown by FIG. 5, by pushing away the curved edges (20 and 21), and the washers are then installed in the recess (26) and the ends (24 and 25) of the curved edges (20 and 21) are folded.

The invention claimed is:

1. A sealing element (1), including an elastic tapered washer (10) and a ductile casing (18) surrounding the washer, and having seal support portions on an outer circumference and an inner circumference, wherein the casing (18) includes a continuous strip (19) in front of one face of the washer, and curved edges (20, 21) at the support portions, where the curved edges include ends (24, 25) extending in front of a portion of a face opposite the elastic washer (10), and in that it includes two supporting washers (27, 28) housed respectively between the elastic washer and the ends of the curved edges, and wherein at least one of the supporting washers has a bead (29, 30) pointing away from the elastic washer and against the end (24, 25) of the curved edge (20, 21).

2. A sealing element according to claim 1, wherein the elastic washer (10) is a crenellated washer, consisting of sectors (14) which are adjacent but separate, on at least one periphery.

3. A sealing element according to claim 2, wherein the elastic washer (10) is formed from a pattern repeated multiple times and consisting of radial segments (11) alternating with outer circumference segments (12) and inner circumference segments (13).

4. A sealing element according to claim 1, wherein the casing is made of PTFE.

5. A sealing element according to claim 4, wherein the PTFE is restructured.

6. A sealing element (1), including an elastic tapered washer (10) and a ductile casing (18) surrounding the washer, and having seal support portions on an outer circumference and an inner circumference, wherein the casing (18) includes a continuous strip (19) in front of one face of the washer, and curved edges (20, 21) at the support portions, where the curved edges include ends (24, 25) extending in front of a portion of a face opposite the elastic washer (10), and in that it includes two supporting washers (27, 28) housed respectively between the elastic washer and the ends of the curved edges, and wherein at least one of the supporting washers has a bead (29, 30) pointing radially beyond the elastic washer (10) and against the curved edge (20, 21).

7. A sealing element according to claim 1, wherein the elastic washer (10) has at least one circular notch (16, 17) to stop one of the supporting washers (26, 27).

8. A sealing element according to claim 1, wherein it includes a metal washer, finer than the elastic washer and the supporting washers, on an inner face or an outer face of the strip of the casing.

9. A sealing element according to claim 6, wherein the elastic washer (10) is a crenellated washer, consisting of sectors (14) which are adjacent but separate, on at least one periphery.

10. A sealing element according to claim 9, wherein the elastic washer (10) is formed from a pattern repeated multiple times and consisting of radial segments (11) alternating with outer circumference segments (12) and inner circumference segments (13).

11. A sealing element according to claim 6, wherein the casing is made of PTFE.

12. A sealing element according to claim 11, wherein the PTFE is restructured.

13. A sealing element according to claim 6, wherein the elastic washer (10) has at least one circular notch (16, 17) to stop one of the supporting washers (26, 27).

14. A sealing element according to claim 6, wherein it includes a metal washer, finer than the elastic washer and the supporting washers, on an inner face or an outer face of the strip of the casing.

* * * * *